E. H. ALLFREE & W. H. ENGLAND.
ADJUSTABLE STEP AND PLATFORM.
APPLICATION FILED JULY 30, 1909.

953,733.

Patented Apr. 5, 1910.

Witnesses:
Robert F. Weir
[signature]

Inventors:
Edwin H. Allfree
William H. England
By Burton U. Hills, Atty.

E. H. ALLFREE & W. H. ENGLAND.
ADJUSTABLE STEP AND PLATFORM.
APPLICATION FILED JULY 30, 1909.

953,733.

Patented Apr. 5, 1910.
7 SHEETS—SHEET 4.

E. H. ALLFREE & W. H. ENGLAND.
ADJUSTABLE STEP AND PLATFORM.
APPLICATION FILED JULY 30, 1909.

953,733.

Patented Apr. 5, 1910.
7 SHEETS—SHEET 5.

Witnesses:

Inventors:
Edwin H. Allfree
William H. England
By Preston U. Hills, Atty.

UNITED STATES PATENT OFFICE.

EDWIN H. ALLFREE AND WILLIAM H. ENGLAND, OF CHICAGO, ILLINOIS.

ADJUSTABLE STEP AND PLATFORM.

953,733.  Specification of Letters Patent.  Patented Apr. 5, 1910.

Application filed July 30, 1909. Serial No. 510,357.

*To all whom it may concern:*

Be it known that we, EDWIN H. ALLFREE and WILLIAM H. ENGLAND, both citizens of the United States, residing at Chicago, in the county of Cook and State of Illinois, have jointly invented certain new and useful Improvements in Adjustable Steps and Platforms, of which the following is a description.

Our invention relates to means for entering or leaving railway cars or other places usually at an elevation, and where the elevation may vary for different cars or places and where it is desired to provide the most safe and convenient means for the purpose.

The object of our invention is to provide a simple, durable and convenient device of the kind described, wherein the distance between the several steps may be adjusted as desired, and the parts firmly locked in their adjusted position.

To this end our invention consists in the novel construction, arrangement and combination of parts herein shown and described and more particularly pointed out in the claims.

In the accompanying drawings wherein like or similar reference characters indicate like or corresponding parts.

Figures 1, 2:
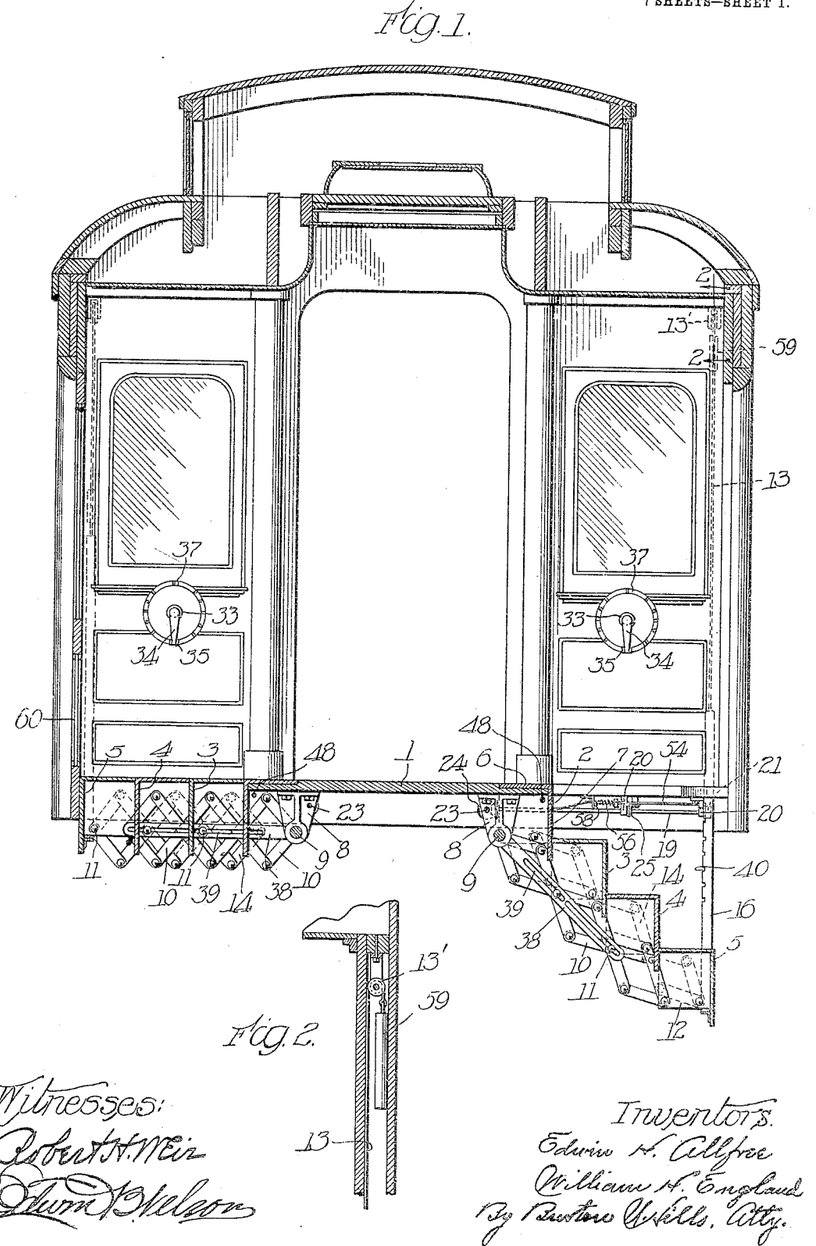
Figure 1, is a transverse vertical section taken through the vestibule of a railway coach equipped with our steps.
Fig. 2, is an enlarged section taken substantially on lines 2—2 of Fig. 1.
Figures 3, 4:
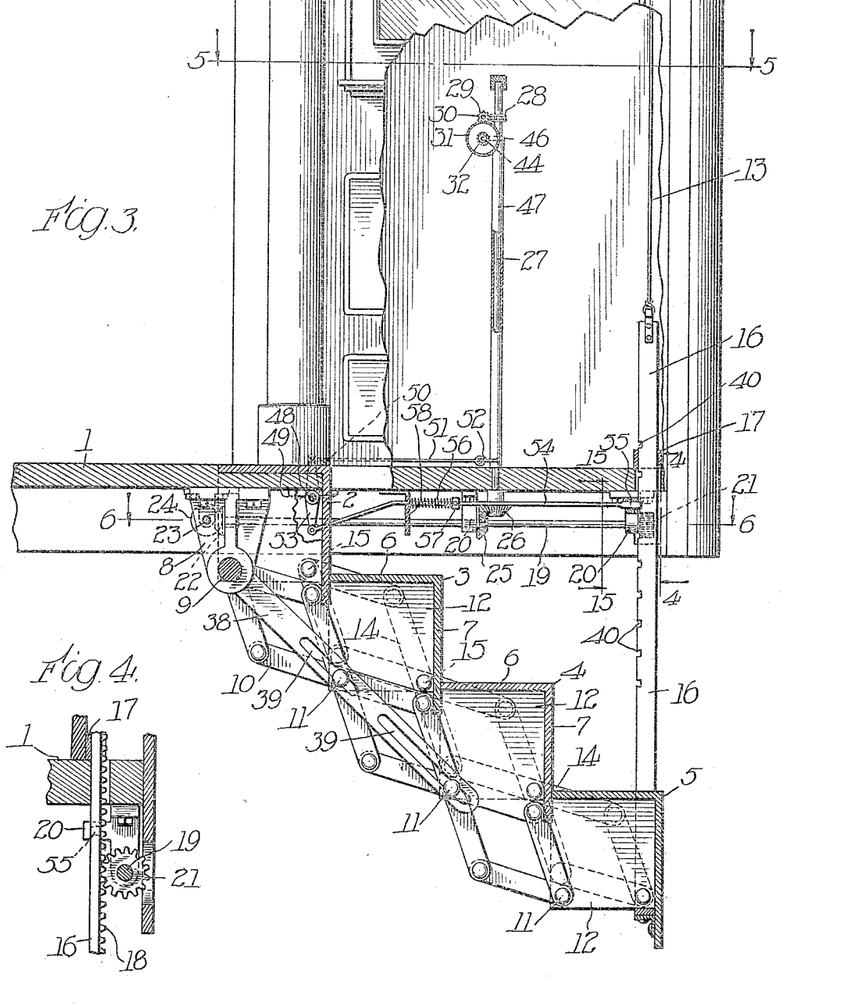
Fig. 3, is an enlarged fragmentary section similar to that shown in Fig. 1, with parts removed and broken away to more clearly show the construction.
Fig. 4, is an enlarged fragmentary section taken substantially on line 4—4 of Fig. 3.
Figure 5:
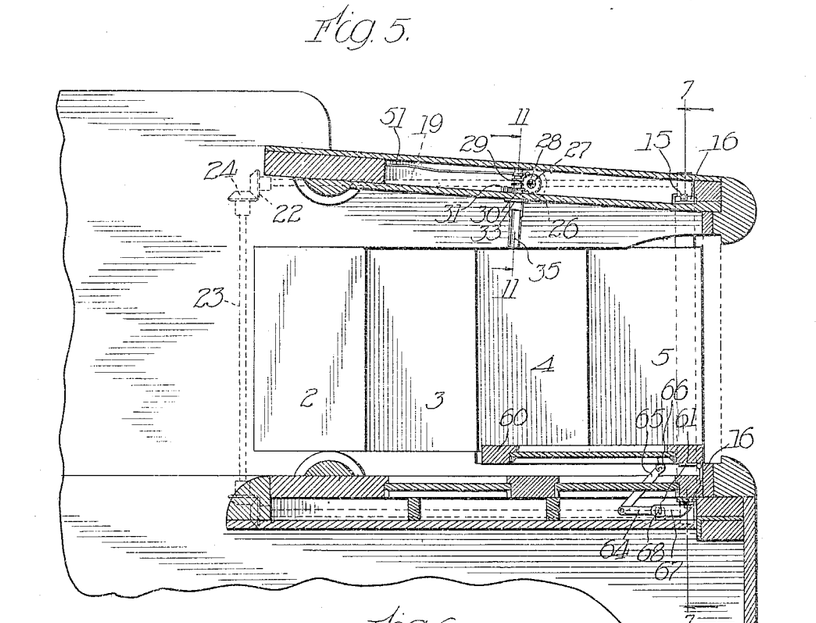
Fig. 5, is a section taken substantially on line 5—5 of Fig. 3.
Figure 6:
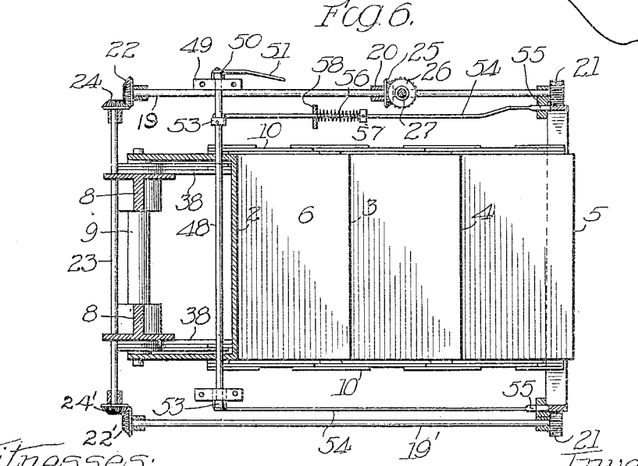
Fig. 6, is a section taken substantially on line 6—6 of Fig. 3.
Figures 7, 8, 9, 10:
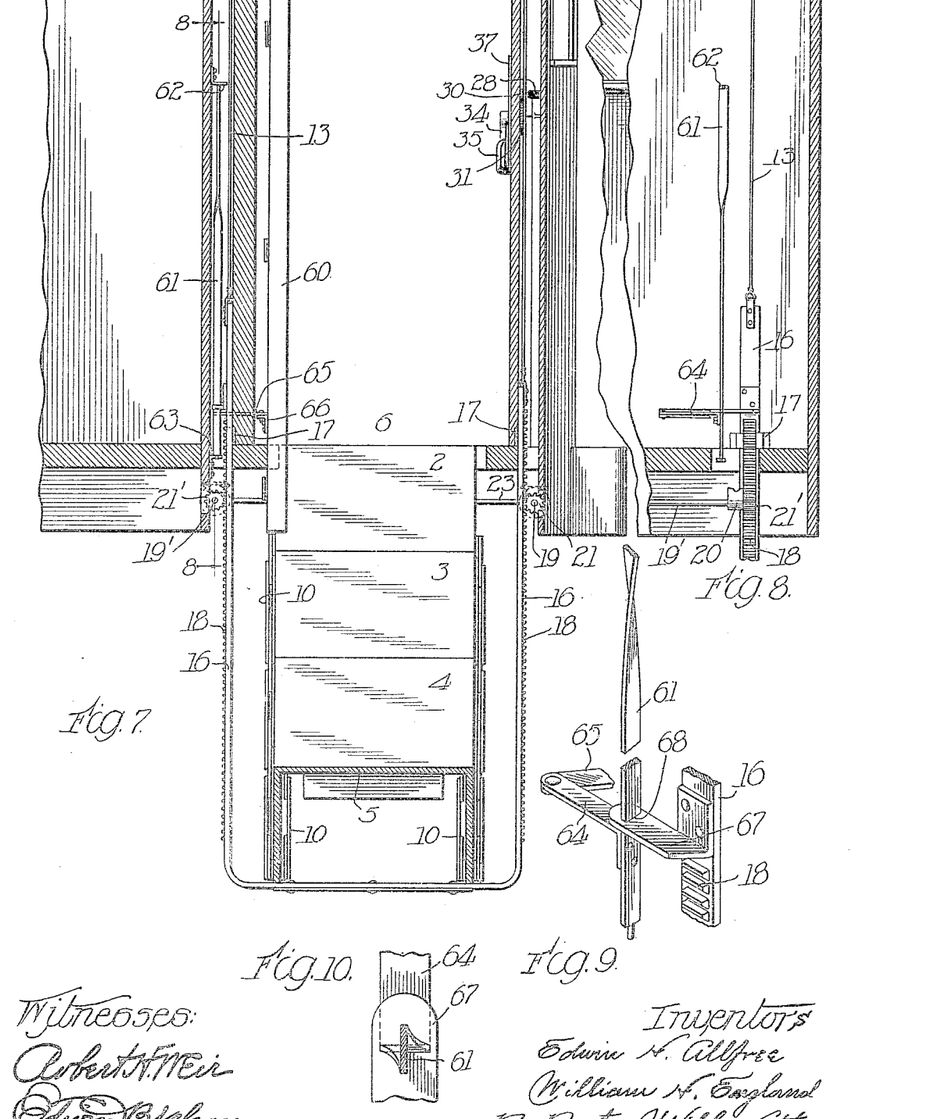
Fig. 7, is a section taken substantially on line 7—7 of Fig. 5.
Fig. 8, is a section taken substantially on line 8—8 of Fig. 7.
Figs. 9 and 10 are enlarged details of a portion of the mechanism shown in Figs. 7 and 8.

In the preferred form shown in the drawings, our device is shown applied to a railway coach in which 1 is the floor of the vestibule of the coach and 2—3—4 and 5 are the steps of our device which may be of any desired form, size or arrangement for affording convenient access to the car. As shown, each step consists of a tread 6 arranged in a substantially horizontal position and a riser 7 rigidly connected to the tread and arranged in a vertical position each extending transversely the full width of the steps or passage way to the vestibule. The step 2 is preferably rigidly secured to the floor 1 and adjacent parts with the tread 6 forming a continuation of the floor. The steps 3—4 and 5 are substantially of the same form as the step 2 and are each arranged with the back of the tread 6 resting against the riser 7 of the next adjacent step. Each step is arranged to move vertically so that the several treads 6 may be brought to a common level to form a platform or continuation of the floor 1, as shown at the left of Fig. 1, or the several treads may be positioned at regular intervals, as shown at the right of Fig. 1.

Any suitable means may be provided for controlling the vertical position of the several steps in relation to the next adjacent step so that the total height of the series may be changed as desired. In the form shown, a pair of brackets or bearings 8—8 are rigidly secured to the under side of the floor 1, to support a shaft 9 or equivalent means rigidly in position in relation to the floor. A pair of lazytongs 10 is mounted near each extremity of the shaft 9 with the several central connections 11, of each of the lazytongs attached to the movable steps 3—4 and 5 respectively. As shown each of the movable steps is provided with a plate or member 12 at each end, and the connections 11 are each pivotally secured to a plate 12 near its extreme corner as far from the tread 6 and riser 7 as practicable. A second pair of lazytongs 14 is provided for each end of our device with its central connections 15—15 pivotally attached to the several parts 12 preferably to its lower corner adjacent the riser 7 as far as practicable from the connections 11. As shown also a bar 38 is attached at one end to the shaft 9 and provided with a longitudinal slot 39 adapted to slidably engage an extension of the connection 11 or other convenient means upon the plate 12 to assist in maintaining the several steps in the proper relation to each other. Obviously when so constructed by rigidly maintaining the steps at the extreme ends of the series in position all the intermediate steps will also be maintained in position and progressively arranged in relation to each other. In the form shown the step 2 is rigidly secured to the floor 1 or other convenient portions of the car. A bar 16 is rigidly attached to each end of the step 5 and arranged to move in suitable guides 17—17 secured to the floor 1 or other convenient part to control the position of the step and raise and lower the same as may be desired. A suitable cord or other flexible connection 13 is attached to each bar 16 and passes upward over a sheave 13′ with a weight 59 attached to its free end to counterbalance our device and aid in its free and smooth operation. As shown the bar 16 is provided with a cog rack 18 upon its outer side. Rotatable shafts 19—19′ are mounted in suitable bearings 20—20 attached to the under side of the floor 1 and a pinion 21 is secured to each shaft adapted to engage with the rack 18 to control the vertical position of the step 5. In the preferred construction shown the shafts 19—19′ are each provided with a beveled gear 22 and 22′ respectively. A shaft 23 is rotatably mounted in suitable bearings upon the underside of the floor 1 and provided with beveled gears 24—24′ at its opposite ends adapted to coöperate with the gears 22—22′ respectively so that the shafts 19—19′ are rotatively connected to each other and a rotation of one will produce a corresponding rotation of the other, thereby maintaining the step 5 in a horizontal position and insuring its free vertical movement.

Any suitable means may be provided for rotating the shafts 19—19′. In the form shown, a bevel gear 25 is rigidly secured to the shaft 19 and arranged to coöperate with a bevel pinion 26 rigidly secured to a vertical shaft 27 preferably positioned in the partition wall at the end of the car. A worm wheel 28 is secured to the upper end of the shaft 27 arranged to mesh with a worm 29 mounted in suitable bearings 29′—29′. In the preferred construction a pinion 30 is rotatively attached to the worm 29 and a gear 31 is arranged to mesh with the pinion 30, so that a single rotation of the gear 31 will produce any desired vertical movement of the step 5.

Figure 11:
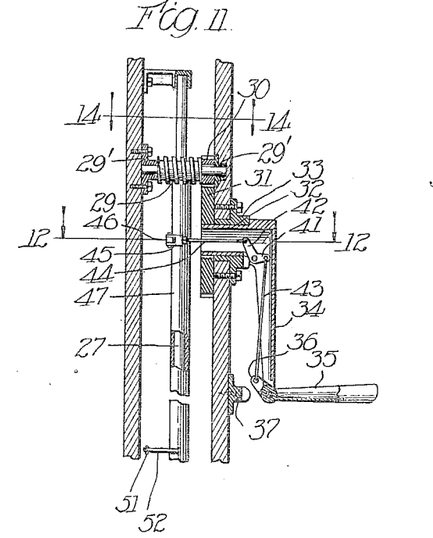
Fig. 11 is an enlarged fragmentary section taken substantially on line 11—11 of Fig. 5.
Figure 12:
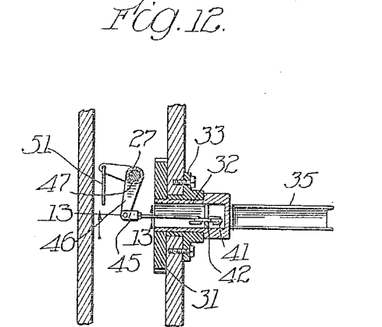
Fig. 12, is a section taken substantially on line 12—12 of Fig. 11.
Figure 13:
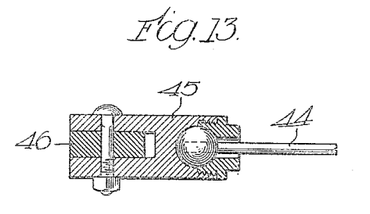
Fig. 13 is an enlarged detail section taken substantially on line 13—13 of Fig. 12.
Figure 14:
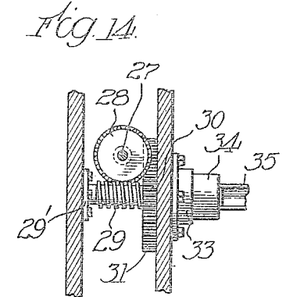
Fig. 14, is a section taken substantially on line 14—14 of Fig. 11.
Figure 15:
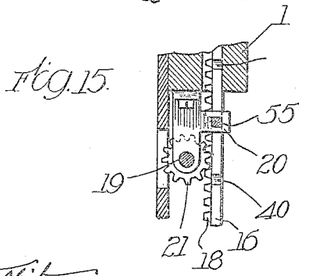
Fig. 15, is an enlarged sectional detail taken substantially on line 15—15 of Fig. 3.
Figure 16:
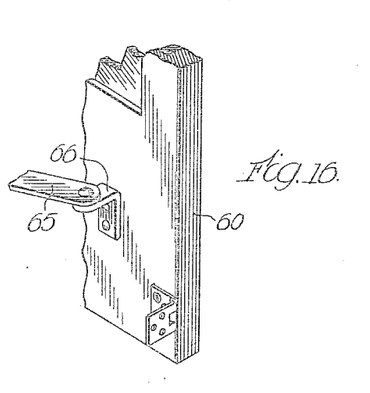
Fig. 16, is an enlarged fragmentary detail of the door controlling mechanism.

Suitable means may be provided for rotating the gear 31 either manually or by means of a suitable compressed air, electric, or other motor. In the form shown (see Fig. 11) the gear 31 is mounted upon a shaft 32 rotatably mounted in a suitable bearing 33 in the car frame. A crank 34 is provided upon the shaft 32 for manually rotating the gear 31. As ordinarily constructed the frictional resistance between the worm 29 and worm wheel 28 is sufficient to maintain the steps in position under any conditions of load or vibration, but as it is of the greatest importance to rigidly maintain the steps in any position desired we prefer to provide auxiliary locking means to prevent the possibility of their displacement. Any suitable means may be provided for this purpose. In the form shown the handle 35 of the crank 34 is pivotally attached to the crank and provided with an extension 36 so arranged that when the handle 35 is in position to be moved for rotating the crank the extension 36 will be folded close to the crank and when the steps are adjusted the handle 35 may be folded against the crank thereby moving the extension 36 into position to engage a suitable segment 37 or other convenient means rigidly secured to the wall of the car and thereby prevent the possibility of the movement of the parts until the handle 35 is again moved into operative position. In the preferred construction suitable locking mechanism is also provided to directly engage the bar 16 to maintain the parts in position in case the adjusting mechanism should become broken or otherwise defective. As shown, the shaft 32 is tubular and a bell crank 41—42 is mounted upon the crank 34. A rod 43 connects the arm 41 to the extension 36 of the handle 35 and a rod 44 preferably provided with a ball and socket connection 45 at one end connects the arm 42 to an arm 46 near the upper end of a sleeve 47 loosely inclosing a part of the shaft 27.

A shaft 48 is mounted in suitable bearings 49—49 below the floor 1 with an arm 50 near one end connected by a rod 51 or other suitable means to an arm 52 near the lower end of the sleeve 47. A pair of levers 53—53 are provided near the ends of the shaft 48 each connected by a rod 54 to a bolt or latch 55 adapted to engage a series of notches or equivalent means 40 in the bars 16. If preferred a spring 56 may be provided for each rod 54 extending from a collar 57 upon the rod to a bracket 58 attached to the floor 1 or other convenient part so that the latches 54 will normally be resiliently forced toward its engaging position.

In the form shown in the drawings, a door 60 is arranged to close the side opening in the coach when the steps are raised to their highest position, that is, when they are sufficiently raised to operate as a platform or a portion of the floor 1, and mechanism controlled by the movement of the steps is provided to automatically open and close the door. The door 60 may be of the usual or any preferred form or construction. As shown, the door 60 is hinged at one side of the opening and closes against permanent stops at each side of the opening and opens inward, the bottom of the door extending slightly below the floor 1, so that the door must always be closed before the steps can be raised to their highest position, and when the steps are in their highest position the door 60 is positively locked against movement in either direction.

In the preferred construction shown a vertical cam-bar 61 is rotatably mounted in suitable bearings 62 and 63 and provided with an arm 64 connected by means of a link 65 to a bracket 66 suitably positioned upon the door 60. An arm 67 provided with a slot 68 or equivalent means adapted to engage the cam-bar 61 and control its position is rigidly secured to the bar 16 so that as the bar 16 and steps in their downward travel arrive at a certain predetermined position the bar 61 will be partially rotated, and the door opened, and when the steps are raised the door will be automatically closed.

Figure 17:
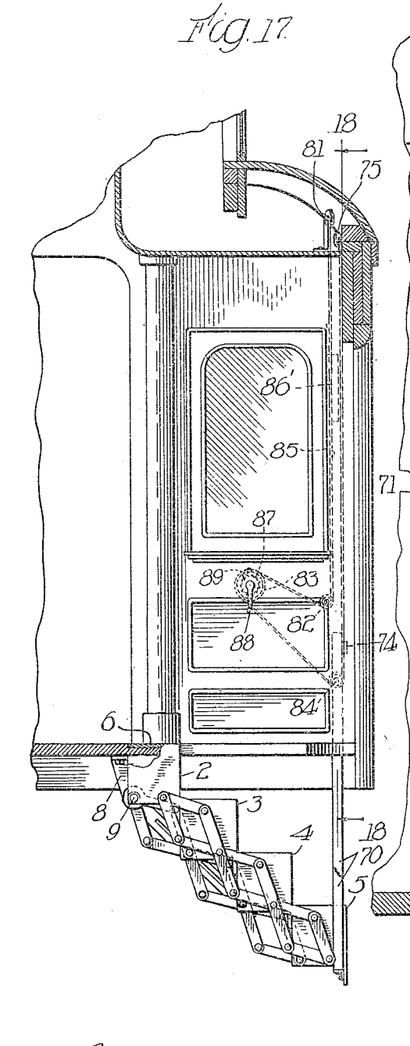
Fig. 17, is a view similar to that shown in Fig. 1, but showing a slightly modified form of our device.
Figure 18:
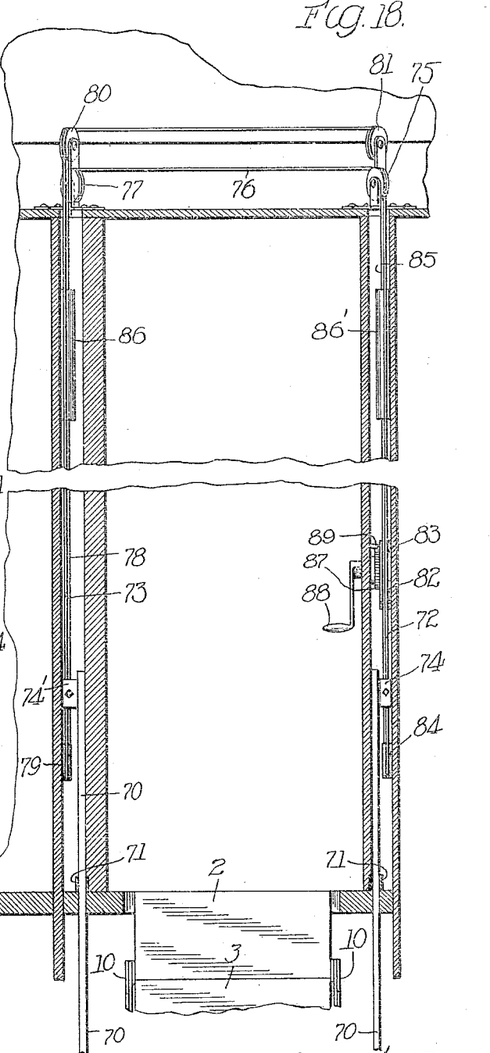
Fig. 18 is a section taken substantially on line 18—18 of Fig. 17.
Figures 19, 20, 21, 22:
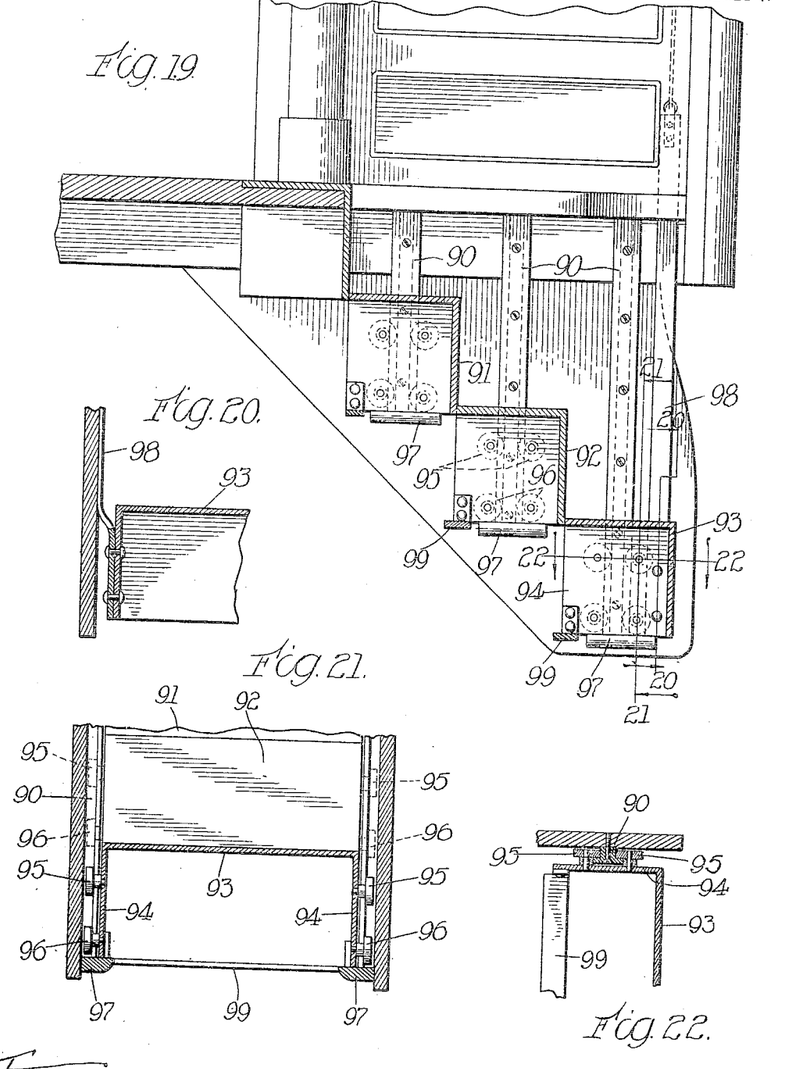
Fig. 19, is a section substantially similar to that shown in Fig. 3 but showing a slightly modified form of our device.
Fig. 20, is a section taken substantially on line 20—20 of Fig. 19.
Fig. 21, is a section taken substantially on line 21—21 of Fig. 19.
Fig. 22, is a section taken substantially on line 22—22 of Fig. 19.

Figs. 17 and 18 show a slightly modified form of adjusting mechanism. In this form the steps 2, 3, 4 and 5 and the parts connecting them together are all substantially the same as hereinbefore shown and described. The bars 70 are rigidly secured to the opposite ends respectively of one of the steps preferably the step 5 and extend upward through suitable guides 71—71 and are rigidly secured to the parts 72 and 73 respectively of an endless chain, cable, or other flexible connection. The part 72 of the chain or connection extends upward from the clamp 74 upon the bar 70 to a sheave 75 thence horizontally as at 76 to a sheave 77, thence downward as at 78 to a sheave 79. From the sheave 79 the part 73 of the chain or connection extends upward to the clamp 74' upon the other bar 70, thence to a sheave 80, thence longitudinally to a sheave 81, and thence the part 85 is directed by the sheaves 82, 83 and 84 back to the clamp 74 where it is rigidly secured. In the preferred construction weights 86—86' are attached to the parts 78 and 85 respectively to counterbalance the weight of the parts and aid in the smooth operation of our device. Any suitable means may be provided to control the movements of the endless connection above described. As shown a crank 88 is rigidly connected to the sheave 83 to move the parts in either direction. A ratchet wheel 87 is also rigidly connected to the sheave 83 and provided with a pawl 89 adapted to lock the wheel in its adjusted position.

In the form shown, in Figs. 19 to 22 inclusive a T-bar 90 is rigidly secured in position to the step hangers at each end of each of the movable steps 91, 92 and 93 and suitable guiding means are provided upon each step to slidably engage the T-bars to control the position of the steps. As shown a plate 94 is provided at each end of each step and a plurality of rollers 95—95 and 96—96 are rotatably secured to the plate 94 in position to engage the T-bar 90 between them for this purpose. Any suitable means may be provided for controlling the vertical position of the several steps. In the form shown a permanent stop 97 or equivalent means for the purpose is rigidly secured to the lower ends of the bars 90 or other convenient parts of the car to limit the downward movement of each step. A bar 98 or other suitable means is attached to the lower or outer step 93 to control the vertical position of the steps, and a projection 99 or other convenient means is provided upon each step arranged to engage a convenient part upon the next inner or upper step when their treads are at substantially an even height to carry the same upward as a platform so that when a step 93 moves upward the stops 99 upon each will successively engage the next adjacent steps in the series and carry them upward. The several parts are so proportioned and arranged that when the step 93 arrives at the upper limit of its movement the tops or treads of the several steps will lie in substantially the same plane, flush with the top of the floor 1.

Having thus described our invention it is obvious that various immaterial modifications may be made in our device without departing from the spirit of our invention hence we do not wish to be understood as limiting ourselves to the exact form or construction shown.

What we claim as new and desire to secure by Letters Patent is:

1. In a device of the kind described, a plurality of substantially parallel members adapted to lie in a common plane, in combination with means rigidly attached to a single member for adjusting the position of said members transversely of said plane, and positively maintaining the members in operative position at all points within the range of their movement.

2. In a device of the kind described, a plurality of substantially parallel horizontal members adapted to lie in a common plane, in combination with means rigidly attached to a single member for adjusting the position of said members transversely of said plane, and positively maintaining the members in operative position at all points within the range of their movement.

3. In a device of the kind described, a plurality of substantially parallel members, each arranged to move in a vertical direction only and adapted to lie in a common plane, in combination with means for adjusting the position of said members, and positively maintaining the members in operative position at all points within the range of their movement.

4. In a device of the kind described, a plurality of substantially parallel members adapted to lie in a common plane and form a continuous platform, in combination with means rigidly attached to a single member for adjusting the position of said members transversely of said plane, and positively maintaining the members in operative position at all points within the range of their movement.

5. In a device of the kind described, a plurality of substantially parallel members adapted to lie in a common plane, in combination with means rigidly attached to a single member for simultaneously adjusting the position of said members transversely of said plane, and positively maintaining the members in operative position at all points within the range of their movement.

6. In a device of the kind described, a plurality of substantially parallel members adapted to lie in a common plane, in combination with means rigidly attached to a single member for adjusting the position of said members progressively transversely of said plane to form a series of steps, said adjusting means being arranged to positively maintain the members in operative position at all points within the range of their movements.

7. In a device of the kind described, a plurality of substantially parallel members adapted to lie in a common plane, in combination with means rigidly attached to a single member for adjusting the position of said members transversely of said plane, and positively maintaining the members in operative position at all points within the range of their movement and means for locking said members at any desired point within the range of their movement.

8. In a device of the kind described, a plurality of substantially parallel members adapted to lie in a common plane, and a movable part adapted to coöperate with said members, in combination with means rigidly attached to a single member for adjusting the position of said members transversely of said plane, and positively maintaining the members in operative position at all points within the range of their movement and mechanism controlled by said adjusting means for actuating said coöperating parts.

9. In a device of the kind described, a plurality of substantially parallel horizontal members each arranged to move in a vertical direction only and adapted to lie in a common plane, in combination with means for adjusting the position of said members, and positively maintaining the members in operative position at all points within the range of their movement.

10. In a device of the kind described, a plurality of substantially parallel horizontal members each arranged to move vertically and adapted to lie in a common plane and form a continuous platform, in combination with means rigidly attached to a single member for adjusting the vertical position of said members, and positively maintaining the members in operative position at all points within the range of their movement.

11. In a device of the kind described, a plurality of substantially parallel horizontal members each arranged to move vertically and adapted to lie in a common plane to form a continuous platform, in combination with means rigidly attached to a single member and pivotally connected to each of the remaining members for simultaneously adjusting the vertical position of said members, and positively maintaining the members in operative position at all points within the range of their movement.

12. In a device of the kind described, a plurality of substantially parallel horizontal members each arranged to move vertically only and adapted to lie in a common plane to form a continuous platform, in combination with means for simultaneously adjusting the vertical position of said members progressively to form a series of steps, said adjusting means being arranged to positively maintain the members in operative position at all points within the range of their movement.

13. In a device of the kind described, a plurality of substantially parallel horizontal members each arranged to move vertically and adapted to lie in a common plane and form a continuous platform, in combination with means rigidly attached to a single member and pivotally connected to each of the remaining members for simultaneously adjusting the vertical position of said members progressively to form a series of steps, said adjusting means being arranged to positively maintain the members in operative position at all points within the range of their movement and means for locking said members at any desired point within the range of their movement.

14. In a device of the kind described, a plurality of substantially parallel horizontal members each arranged to move vertically and adapted to lie in a common plane and form a continuous platform and a movable part adapted to coöperate with said members, in combination with means rigidly attached to a single member and pivotally connected to each of the remaining members for simultaneously adjusting the position of said members progressively transversely of said plane, to form a series of steps, said adjusting means being arranged to positively maintain the members in operative position at all points within the range of their movement, means for locking said members at any desired point within the range of their movement, and mechanism controlled by said adjusting means for actuating said coöperating part.

15. In a device of the kind described, a plurality of substantially parallel members adapted to lie in a common plane and form a continuous surface and a movable part adapted to coöperate with said members, in combination with means rigidly attached to a single member and pivotally connected to each of the remaining members for simultaneously adjusting the position of said members progressively transversely of said plane, and positively maintaining the members in operative position at all points within the range of their movement, means for locking said members at any desired point within the range of their movement and mechanism controlled by said adjusting means for actuating said coöperating part.

16. In a device of the kind described, a plurality of substantially parallel members adapted to lie in a common plane and a movable part adapted to coöperate with said members, in combination with means rigidly attached to a single member and pivotally connected to each of the remaining members for simultaneously adjusting the position of said members progressively transversely of said plane, and positively maintaining the members in operative position at all points within the range of their movement, means for locking said members at any desired point within the range of their movement, and mechanism controlled by said adjusting means for actuating said coöperating part.

17. In a device of the kind described, a plurality of substantially parallel members adapted to lie in a common plane, and a pivotally mounted door adapted to coöperate with said members, in combination with means rigidly attached to a single member and pivotally connected to each of the remaining members for adjusting the position of said members progressively transversely of said plane, and positively maintaining the members in operative position at all points within the range of their movement, means for locking said members at any desired point within the range of their movement, and mechanism controlled by said adjusting means for operating said door.

18. In a device of the kind described, a plurality of substantially parallel members adapted to lie in a common plane, and a movable part adapted to coöperate with said members, in combination with means rigidly attached to a single member and pivotally connected to each of the remaining members for adjusting the position of said members transversely of said plane, and positively maintaining the members in operative position at all points within the range of their movement, means for locking said members at any desired point within the range of their movement, and mechanism controlled by said adjusting means for operating said coöperating part.

19. In a device of the kind described, a plurality of substantially parallel members each arranged to move vertically only and adapted to lie in a common plane to form a continuous platform, in combination with means for adjusting the vertical position of said members, and positively maintaining the members in operative position at all points within the range of their movement.

20. In a device of the kind described, a plurality of substantially parallel members each arranged to move vertically only and adapted to lie in a common plane, in combination with means for simultaneously adjusting the vertical position of said members, and positively maintaining the members in operative position at all points within the range of their movement.

21. In a device of the kind described, a plurality of substantially parallel members each arranged to move in a vertical direction only and adapted to lie in a common plane, in combination with means rigidly attached to a single member and pivotally connected to each of the remaining members for adjusting the position of said members progressively to form a series of steps, said adjusting means being arranged to positively maintain the members in operative position at all points within the range of their movement.

22. In a device of the kind described, a plurality of substantially parallel members each arranged to move in a vertical direction only and adapted to lie in a common plane, in combination with means rigidly attached to a single member and pivotally connected to each of the remaining members for adjusting the position of said members, and means for locking said members at any desired point within the range of their movement.

23. In a device of the kind described, a plurality of substantially parallel members each arranged to move in a vertical direction only and adapted to lie in a common plane, and a movable part adapted to coöperate with said members, in combination with means rigidly attached to a single member and pivotally connected to each of the remaining members for adjusting the position of said members, positively maintaining the same in operative position at all points within the range of their movement, and mechanism controlled by said adjusting means for operating said coöperating part.

24. A device of the kind described, comprising a stationary and a movable member and means connecting said members for supporting a plurality of similar members and controlling their position, and means independent of said connecting means for controlling the position of said movable member.

25. A device of the kind described, comprising a series of members, means for controlling the position of two members of the series, and means independent of said controlling means connecting said two members for supporting the remaining members of the series.

26. A device of the kind described, comprising a series of members and means for controlling the position of two of said members, in combination with means independent of said controlling means positioned at the ends of, and connecting said two members, for supporting the remaining members of the series.

27. A device of the kind described, comprising a pair of members, one of which is stationary and the other provided with means for controlling both its vertical and horizontal positions, in combination with a plurality of similar members and means attached to said movable member independent of said controlling means for supporting said similar members in position.

28. A device of the kind described, comprising a pair of members one of which is stationary and the other provided with means for controlling both its vertical and horizontal positions, in combination with a plurality of similar members, and means independent of said controlling means connecting said movable and said stationary members for supporting said similar members in position.

29. A device of the kind described, comprising a pair of members, one of which is stationary and the other provided with means for controlling both its vertical and horizontal positions, in combination with a plurality of similar members and means attached to said movable member independent of said controlling means for controlling the position of each of said similar members.

30. A device of the kind described, comprising a pair of members, one of which is stationary, and the other is provided with means for controlling both its vertical and horizontal positions, in combination with a plurality of similar members positioned between said movable and said stationary members, and means attached to said movable member independent of said controlling means for supporting said similar members in position.

31. A device of the kind described, comprising a pair of members, one of which is stationary, and the other, provided with means for controlling both its vertical and horizontal positions, in combination with a plurality of similar members positioned between said movable member and said stationary member and means independent of said controlling means connecting said movable and said stationary members, for supporting said similar members in position.

32. In a device of the kind described, a platform comprising a plurality of adjustable parts, and means rigidly attached to a single member for adjusting and positively maintaining each member in operative position at all points within the range of its movement to form a series of steps.

33. In a device of the kind described, a platform comprising a plurality of similar vertically adjustable parts, and means rigidly attached to a single member for adjusting and positively maintaining each member in operative position at all points within the range of its movement to form a series of steps.

34. In a device of the kind described, a platform comprising a plurality of adjustable parts, and means rigidly attached to a single member for simultaneously adjusting and positively maintaining each member in operative position at all points within the range of its movement to form a series of steps.

35. In a device of the kind described, a plurality of substantially parallel members adapted to lie in a common plane, in combination with means rigidly attached to a single member for adjusting the position of said members transversely of said plane.

In testimony whereof we have hereunto signed our names in the presence of two subscribing witnesses.

EDWIN H. ALLFREE.
WILLIAM H. ENGLAND.

Witnesses:
BURTON U. HILLS,
BLANCHE CHALMERS.